US011829413B1

(12) United States Patent
Hao et al.

(10) Patent No.: US 11,829,413 B1
(45) Date of Patent: Nov. 28, 2023

(54) TEMPORAL LOCALIZATION OF MATURE CONTENT IN LONG-FORM VIDEOS USING ONLY VIDEO-LEVEL LABELS

(71) Applicant: Amazon Technologies, Inc., Seattle, WA (US)

(72) Inventors: Xiang Hao, Kenmore, WA (US); Jingxiang Chen, Bellevue, WA (US); Vernon Germano, Bainbridge Island, WA (US); Muhammad Raffay Hamid, Seattle, WA (US); Lakshay Sharma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 17/030,103

(22) Filed: Sep. 23, 2020

(51) Int. Cl.
*G06F 16/783* (2019.01)
*G06N 20/00* (2019.01)
*G06F 16/75* (2019.01)

(52) U.S. Cl.
CPC .......... *G06F 16/7847* (2019.01); *G06F 16/75* (2019.01); *G06N 20/00* (2019.01)

(58) Field of Classification Search
CPC ......... G06N 20/00; G06F 3/048; G06V 20/46
See application file for complete search history.

(56) References Cited

U.S. PATENT DOCUMENTS

| 2007/0050811 | A1* | 3/2007 | Moriwaki | ............ | H04N 21/482 |
| | | | | | 725/38 |
| 2009/0034851 | A1* | 2/2009 | Fan | .................... | G06Q 30/0603 |
| | | | | | 382/229 |

(Continued)

OTHER PUBLICATIONS

Davis et al., "Comparison of Parametric Representations for Monosyllabic Word Recognition in Continuously Spoken Sentences", IEEE Transactions on Acoustics, Speech, and Signal Processing, 1980, pp. 195-219.

(Continued)

*Primary Examiner* — Grace Park
(74) *Attorney, Agent, or Firm* — NICHOLSON DE VOS WEBSTER & ELLIOTT LLP

(57) ABSTRACT

Techniques for temporal localization of mature content in long-form videos using only video-level labels are described. According to some embodiments, computer-implemented method includes receiving a request to train a machine learning model on a training video file comprising at least one mature content label, training the machine learning model to generate a feature vector for each of a plurality of video frames of the training video file, generate a plurality of frame-level mature content classification scores of the training video file from the feature vectors of the training video file, and generate a video-level mature content classification score of the training video file from the plurality of frame-level mature content classification scores for the training video file based at least in part on the at least one mature content label of the training video file, receiving a request for an input video file, generating, by the machine learning model in response to the request, a feature vector for each of a plurality of video frames of the input video file, a plurality of frame-level mature content classification scores of the input video file from the feature vectors of the input video file, and a video-level mature content classification score of the input video file from the plurality of frame-level mature content classification scores for the input video file, and transmitting the plurality of frame-level mature content classification scores of the input video file or the video-level mature content classification score of the input video file to a client application or to a storage location.

20 Claims, 14 Drawing Sheets

(56) References Cited

U.S. PATENT DOCUMENTS

| | | | | |
|---|---|---|---|---|
| 2009/0288112 | A1* | 11/2009 | Kandekar | H04N 21/4532 725/32 |
| 2013/0259375 | A1* | 10/2013 | Dunlop | G06V 20/35 382/173 |
| 2014/0149596 | A1* | 5/2014 | Emerson, III | H04N 21/472 709/231 |
| 2017/0124398 | A1* | 5/2017 | Birkbeck | G06V 20/46 |
| 2018/0349391 | A1* | 12/2018 | Chechik | G06F 16/783 |
| 2020/0275158 | A1* | 8/2020 | Gaur | G06N 3/0454 |
| 2021/0037271 | A1* | 2/2021 | Bikumala | G06V 10/70 |

OTHER PUBLICATIONS

Gao et al., "Cascaded Boundary Regression for Temporal Action Detection", Computer Vision and Pattern Recognition, 2017, pp. 1-11.

Gkioxari et al., "Finding Action Tubes", In Proceedings of the IEEE Conference on Computer Vision and Pattern Recognition, 2015, pp. 759-768.

He et al., "Identity Mappings in Deep Residual Networks", Springer International Publishing, 2016, pp. 630-645.

Korbar et al., "SCSampler: Sampling Salient Clips from Video for Efficient Action Recognition", In Proceedings of the IEEE International Conference on Computer Vision, 2019, pp. 6232-6242.

Lea et al., "Temporal Convolutional Networks: A unified Approach to Action Segmentation", Springer International Publishing, 2016, 8 pages.

Lecun et al., "Backpropagation applied to handwritten zip code recognition", Neural Computation, vol. 1, No. 4, Dec. 1989, pp. 541-551.

Lim et al., "Rare Sound Event Detection Using 1D Convolutional Recurrent Neural Networks", Detection and Classification of Acoustic Scenes and Events, 2017, 5 pages.

Liu et al., "Completeness Modeling and Context Separation for Weakly Supervised Temporal Action Localization", In Proceedings of the IEEE Conference on Computer Vision and Pattern Recognition, 2019, pp. 1298-1307.

Luong et al., "Effective Approaches to Attention-based Neural Machine Translation", Proceedings of the 2015 Conference on Empirical Methods in Natural Language Processing, Sep. 2015, 11 pages.

Ma et al., "Learning Activity Progression in LSTMs for Activity Detection and Early Detection", In Proceedings of the IEEE Conference on Computer Vision and Pattern Recognition, 2016, pp. 1942-1950.

Nguyen et al., "Weakly Supervised Action Localization by Sparse Temporal Pooling Network", In Proceedings of the IEEE Conference on Computer Vision and Pattern Recognition, 2018, pp. 6752-6761.

Parikh et al., "A Decomposable Attention Model for Natural Language Inference", Proceedings of the 2016 Conference on Empirical Methods in Natural Language Processing, Nov. 2016, pp. 2249-2255.

Paul et al., "W-TALC: Weakly-supervised Temporal Activity Localization and Classification", In Proceedings of the European Conference on Computer Vision, 2018, 17 pages.

Ren et al., "Faster R-CNN: Towards Real-Time Object Detection with Region Proposal Networks", Advances in Neural Information Processing Systems 28 (NIPS 2015), 2015, 9 pages.

Russakovsky et al., "ImageNet Large Scale Visual Recognition Challenge", International Journal of Computer Vision, Dec. 1, 2014, 37 pages.

Shou et al., "Temporal action localization in untrimmed videos via multi-stage CNNs", In Proceedings of the IEEE Conference on Computer Vision and Pattern Recognition, Apr. 2016, 10 pages.

Tran et al., "Learning Spatiotemporal Features with 3D Convolutional Networks", In Proceedings of the IEEE International Conference on Computer Vision, 2015, pp. 4489-4497.

Yeung et al., "End-to-end Learning of Action Detection from Frame Glimpses in Videos", In Proceedings of the IEEE Conference on Computer Vision and Pattern Recognition, Mar. 13, 2017, 10 pages.

Zhang et al., "Real-time Action Recognition with Enhanced Motion Vector CNNs", In Proceedings of the IEEE Conference on Computer Vision and Pattern Recognition, 2016, 9 pages.

Zhou et al., "Learning deep features for discriminative localization", In Proceedings of the IEEE Conference on Computer Vision and Pattern Recognition, Dec. 2015, 10 pages.

* cited by examiner

TEMPORAL LOCALIZATION OF MATURE CONTENT IN LONG-FORM VIDEOS USING ONLY VIDEO-LEVEL LABELS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
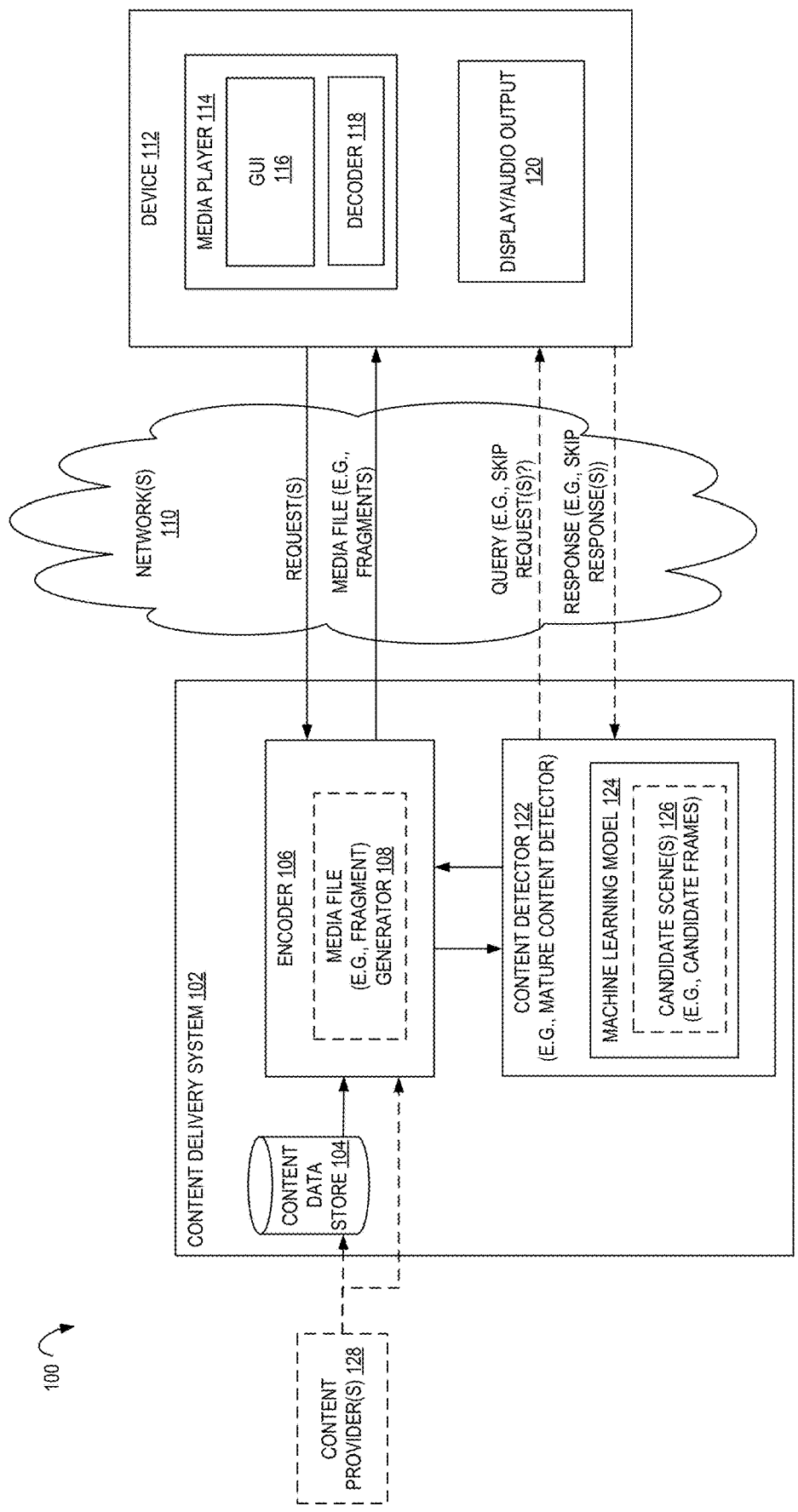
FIG. 1 is a diagram illustrating an environment including a content delivery system, having a content detector, to generate and send media files (e.g., fragments) to a device according to some embodiments.

The present disclosure relates to methods, apparatus, systems, and non-transitory computer-readable storage media for detecting mature content in video files using video-level labels. More particularly, certain embodiments herein utilize temporal localization of mature content in long-form (e.g., series and movies) videos using only video-level labels (for example, not requiring use of finer granularity of labels, e.g., not requiring use of scene level labels and/or frame level labels). In one embodiment, a series is a connected set of (e.g., television) program episodes that run under the same title, possibly spanning many seasons.

A content provider (e.g., via a content delivery system) may offers millions of videos (e.g., series and/or movies) for its customers. These videos can contain mature content, e.g., activities involving sexuality or nudity. Exposing their customers to such content can deteriorate the video watching experience of those customers and reduce their engagement. For such videos, certain embodiments herein provide a selective video watching experience for viewers (e.g., customers), for example, allowing a customer to skip certain parts (e.g., scene(s)) of a video that includes mature content while still allowing viewing of the remaining portions of the video. Certain embodiments herein are directed to an automated solution to efficiently localize the mature content (e.g., sexual and nudity-related content) in videos in a scalable manner. For example, by utilizing localization of mature (e.g., unsuitable) video content as a weakly-supervised temporal action localization problem that (e.g., only) requires video-level labels. Certain embodiments herein are directed to an end-to-end machine learning (e.g., deep learning-based) framework to learn the parameters of a localization model. One embodiment utilizes convolution neural networks (CNNs) of a machine learning model to extract video (e.g., and audio) features from videos and uses the features (e.g., in a feature vector) to detect mature related content (e.g., sexuality and nudity related content) at each video frame, fully connected layers of the machine learning model to obtain frame-level detection scores (e.g., frame-level mature content classification scores) which improves the compute and space requirements of the network and enables efficient processing of (e.g., long-form) videos, and aggregates the frame-level detection-scores to a video-level score (e.g., video-level mature content classification score) through a novel attention mechanism that allows the machine learning model to cover more action scenes simultaneously. Certain embodiments herein are used in a content descriptor of maturity content.

As noted above, many videos may contain video and/or audio of offensive activities, e.g., mature content. Exposing a video (e.g., streaming) service's customers to such content can severely damage their experience, and potentially reduce the engagement with the video service. To minimize such a risk, a content maturity rating may be used to categorize a video into an appropriate rating level that tells what age group of audiences is suitable for the video. Mature content may include one or more of the following classes:

sexually explicit content (e.g., sexuality/nudity), violent or graphic content (e.g., horror and/or violence), dangerous or unlawful content (e.g., drug abuse), hateful content, harassment or cyberbullying content, or any combination thereof. This may cover visual content and/or audial content (e.g., explicit language).

Certain embodiments herein allow a user (e.g., streaming service's customer) to skip mature (e.g., sexually explicit content) while still watching the remaining parts of the video. To enable this customer experience, certain embodiments herein localize the mature content in a video, e.g., and determine where the mature content activities start and end (e.g., using time stamps and/or frame identification values). In one embodiment, when mature content is identified, the (e.g., content delivery) system indicates this to the customer (e.g., at least a few seconds before the actual mature content is displayed to the customer), and the customer can choose to skip the content if they desire. The localization of the mature content can be used to trim the video (e.g., trailers or full length movies, series episodes, etc.) to remove mature content, e.g., removed before sending the video (e.g., the proper subset of the video that includes that mature content) to the viewer. For example, given a single video (e.g., a video title), certain embodiments herein create a version of the same title by removing (e.g., all) mature content localized by the machine learning model disclosed herein and offer the customer a choice to watch this trimmed version instead of the original version. As another example, if it is desired to (e.g., automatically) display a trailer while customers are browsing the titles, certain embodiments herein remove the mature content to avoid showing customers content they may prefer not to see.

Certain embodiments herein utilized a machine learning model to infer one or more proper subsets (e.g., scenes) of a video, e.g., instead of a human reviewing the entire video and manually labeling scene(s) with mature content. A manual review process is generally very time consuming, e.g., with a human needing to check each frame and refer to an internal standard policy to determine whether it is mature content (e.g., offensive). Certain embodiments herein provide for an improved system to infer a proper subset of candidate scenes of a single videos (e.g., titles) and/or a proper subset of videos (e.g., titles) for further review, e.g., review by a human and thus help the human to identify possible mature content and significantly reduce their review time.

In certain embodiments, a first method for action recognition and localization is to treat the problem (e.g., detecting mature content) as a supervised learning problem, e.g., collecting the start and end timestamp of actions, and using this information to create frame-level (e.g., label the frames within that time period as positive and outside as negative) or clip-level labels and then fitting a classifier model on the frame level or clip level to classify content. However, in certain embodiments this is very labor intensive and time consuming due to the annotation of the action windows.

In certain embodiments, a second method for action recognition and localization is to perform weakly temporal localization, e.g., which assumes only title-level labels (e.g., for mature content classes discussed herein) are available and formulates the problem as a weakly supervised learning problem. In one embodiment, this approach is to train a video title-level model that aggregates the frame-level information to title level, and also produces scores on the frame level for localization purpose. In certain of these embodiments, an advantage is that it only requires the title-level labels. For example, where there are not labels for a proper subset of a video (e.g., where there are not scene-level labels) and/or title-level labels are easier/cheaper to obtain, weakly temporal localization is utilized for mature content detection.

However, there are several challenges in building a weakly temporal localization solution for mature content detection. First, certain embodiments of a machine learning model do not work in full length episodes and/or movies, e.g., they only work satisfactory on short videos (e.g., from dozens of seconds to a few minutes long). One reason is that long videos contain numerous irrelevant frames so that it is very difficult for the model to pick the salient information precisely. Another reason is it is difficult to capture all actions when multiple instances of the same type of actions can exist in the same video since the action with relatively stronger signals can dominate the loss of the model during optimization.

Figure 3:
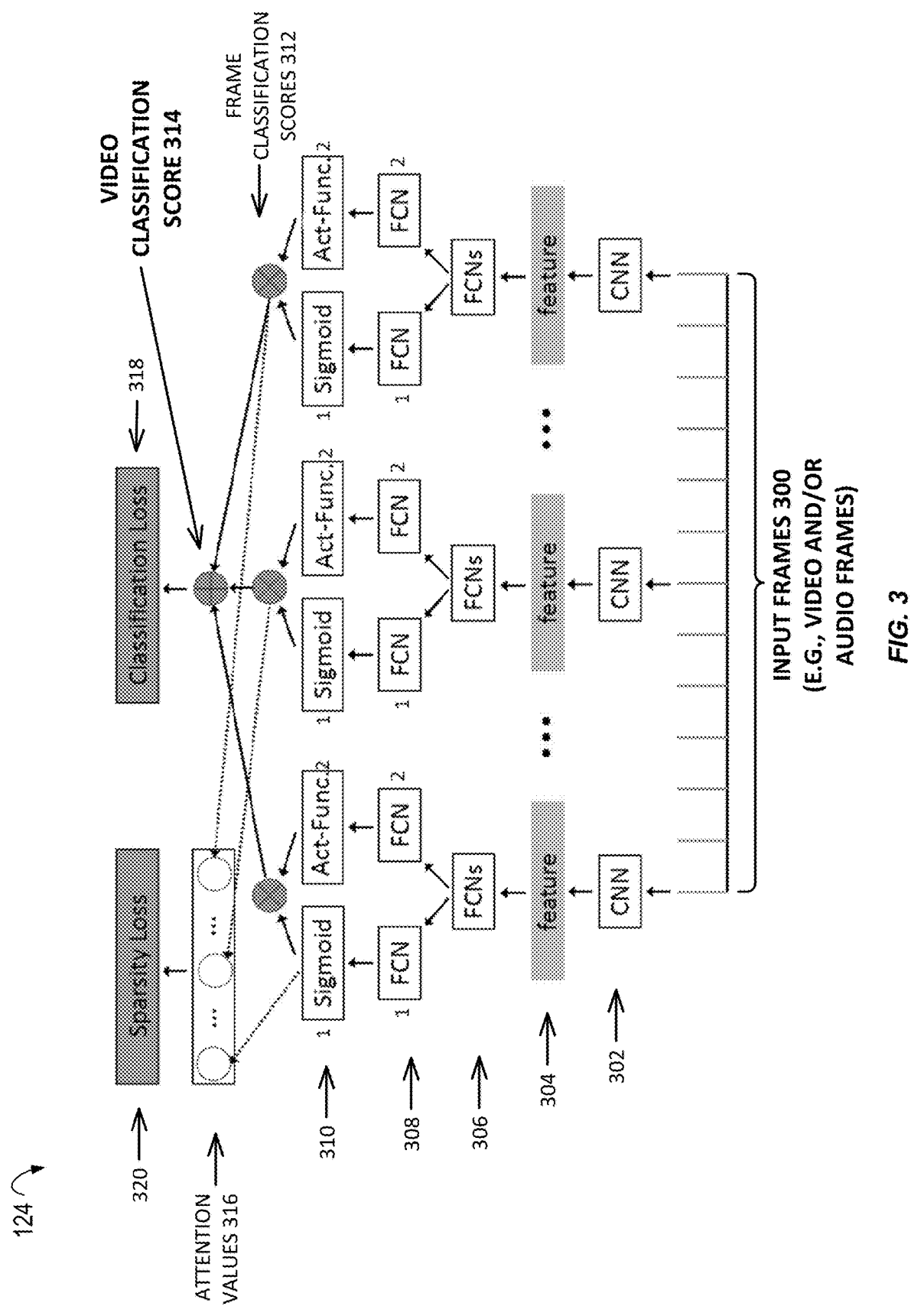
FIG. 3 is a diagram illustrating a network architecture of a machine learning model for content detection according to some embodiments.

To solve these challenges, certain embodiments herein utilize a weakly temporal localization based machine learning model architecture that: (1) (e.g., to better handle long videos) uses fully connected layers for the frame-level detection to make the model's network both computationally and memory efficient, for example, due to the nature of mature content (e.g., sexually explicit content), a frame (e.g., image) may contains varying information indicating the mature content activities, and performing frame-level detection helps to compress the information earlier on in the network and therefore reduces the computation and memory required in the next stages of the network, and/or (2) uses a new attention mechanism with a sparsity loss to enable the model to cover multiple positive scenes simultaneously, e.g., where a sigmoid attention does not work when the video length varies as the sigmoid attention does not normalize across the whole video, and on the other hand, where the activation in an (e.g., activation function, including, but not limited to softmax) attention is exponential and is unbounded, a strong mature content scene can end up with a very large activation at some frames, leading to relative low weights to other mature content scenes from the same title. In certain embodiments, an attention mechanism discussed herein (e.g., as shown in FIG. 3) combines the strengths of sigmoid and softmax based attentions without letting the stronger scenes dominate the results. In addition, since mature content scenes may be sparse in videos (e.g., in episodes and movies in general), embodiments herein leverage an attention mechanism with a sparsity loss to automatically eliminate irrelevant video frames and help the model to focus its prediction power on the most relevant scenes.

Certain embodiments of action recognition aim at detecting the targeted action, e.g., and are formulated as a classification problem. Certain embodiments herein utilize a machine learning model (e.g., a convolutional neural networks (CNNs)) to leverage the spatial nature of images (e.g., frames of a video) to enable extraction of discriminative image features and outperform hallow-learning or hand-crafted computer vision techniques with excellent performance in many vision tasks. A machine learning model (e.g., CNN) may also be used as a powerful way to process audio signals. For instance, a one-dimensional (1D) CNN may be applied to raw audio features to accurately capture the frame-level audio transitions resulting in better audio representations for applications, e.g., for rare sound event detection. Compared with action recognition, action localization may be a more complicated task that requires the detection of temporal volume that contains the targeted action. Certain embodiments herein do (or do not in other embodiments) use multi-stage CNNs (e.g., as a combination of CNN and a recurrent neural network (RNN)), action models on spatio-temporal feature representations, weakly supervised learning (e.g., which only relies on title level labels for localization), a cross-modal temporal regression localizer to localize action using language query (e.g., requiring paired video-sentence data for training), video-level class labels to predicts temporal intervals of human actions in untrimmed videos, and/or a multi-branch neural network to localize action more accurately. However, certain of these embodiments do not allow for the capture of targeted actions for long videos, especially when the actions may exist at multiple locations. Embodiments that allow for mature content detection in (e.g., long) videos are described further below (e.g., with an example network architecture of a machine learning model described in reference to FIG. 3).

FIG. 1 is a diagram illustrating an environment 100 including a content delivery system 102, having a content detector 122, to generate and send media files (e.g., fragments) to a device 112 according to some embodiments. The depicted content delivery system 102 includes a content data store 104, which may be implemented in one or more data centers. In one embodiment, the media file (e.g., video file that is to be viewed by the device 112) is accessed (for example, from the content data store 104 or directly from a content provider 128, e.g., as a live stream) by encoder 106 (e.g., by media file (e.g., fragment) generator 108). In certain embodiments, the (e.g., client) device 112 requesting the media file (e.g., fragment(s) of media) from content delivery system 102 causes the encoder 106 to encode the video file, e.g., into a compressed format for transmittal on network(s) 110 to device 112. In one embodiment, the media file generator 108 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

It may be desirable to detect certain (e.g., mature) content in the video file. Content delivery system 102 includes a content detector 122 (e.g., a mature content detector). Content detector 122 may use one or more machine learning models 124 to detect certain (e.g., mature) content. For example, with machine learning model 124 identifying one or more candidate scenes 126 (e.g., candidate frames) that include the content (e.g., mature content). Training and use of the machine learning model 124 are discussed further below, e.g., in reference to FIGS. 2-4.

In FIG. 1, content delivery system 102 is coupled to device 112 via one or more networks 110, e.g., a cellular data network or a wireless local area network (WLAN).

In certain embodiments, content delivery system 102 (e.g., content detector 122 thereof) is to send a query (e.g., skip request) to device 112, for example, and the device (e.g., in response to a command from a user of the device 112) is to send a response (e.g., an indication to skip or not skip certain scene(s)).

Depicted device 112 includes a media player 114 having a graphical user interface (GUI) 116, e.g., to display a query for the inferred (e.g., mature) content, and decoder 118 to decode the media file (e.g., fragment) from the content delivery system 102, e.g., to display video and/or audio of the media file on display and/or audio output 120, respectively.

Figure 5:
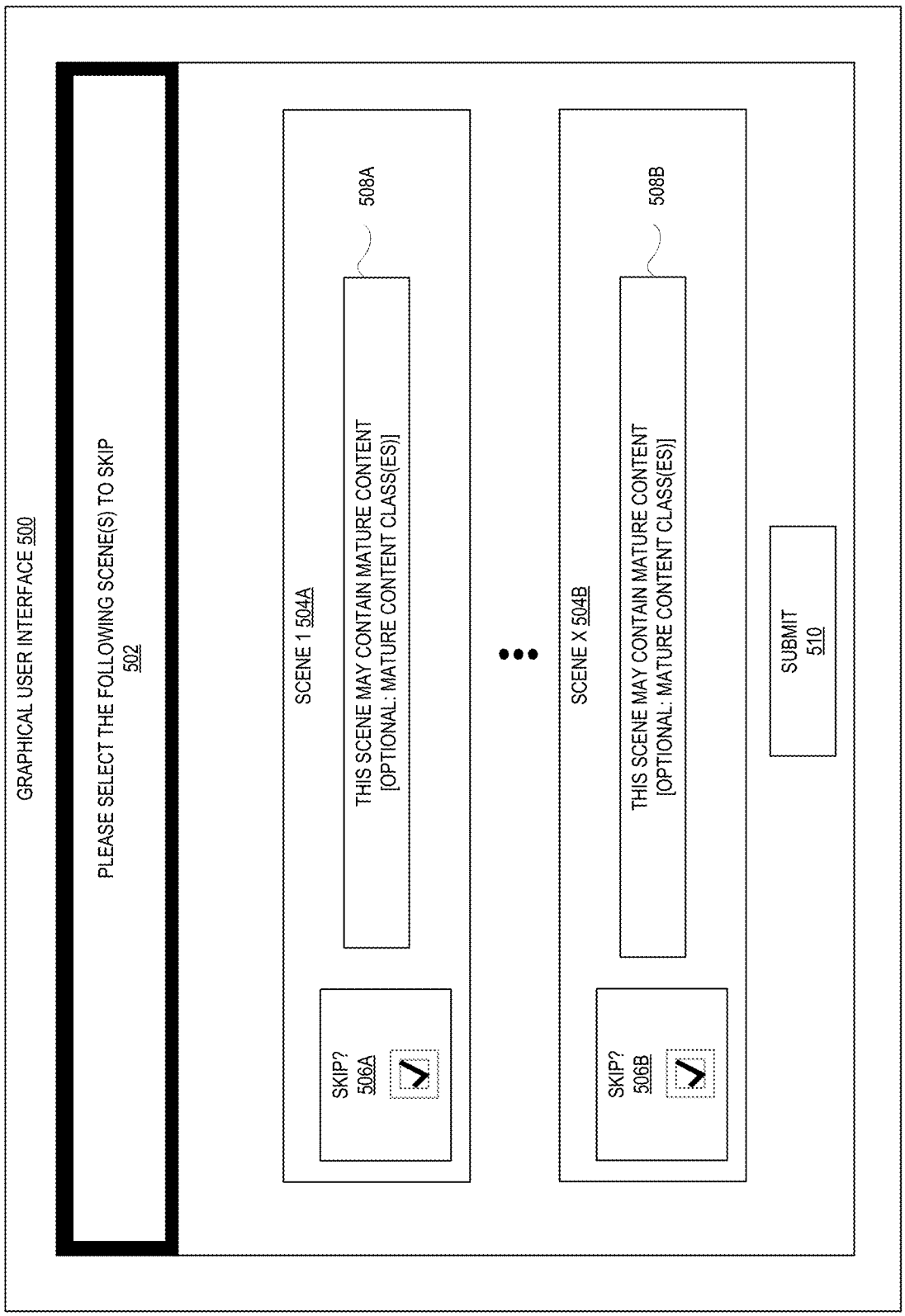
FIG. 5 is a diagram illustrating a graphical user interface for scene skipping according to some embodiments.
Figure 6:
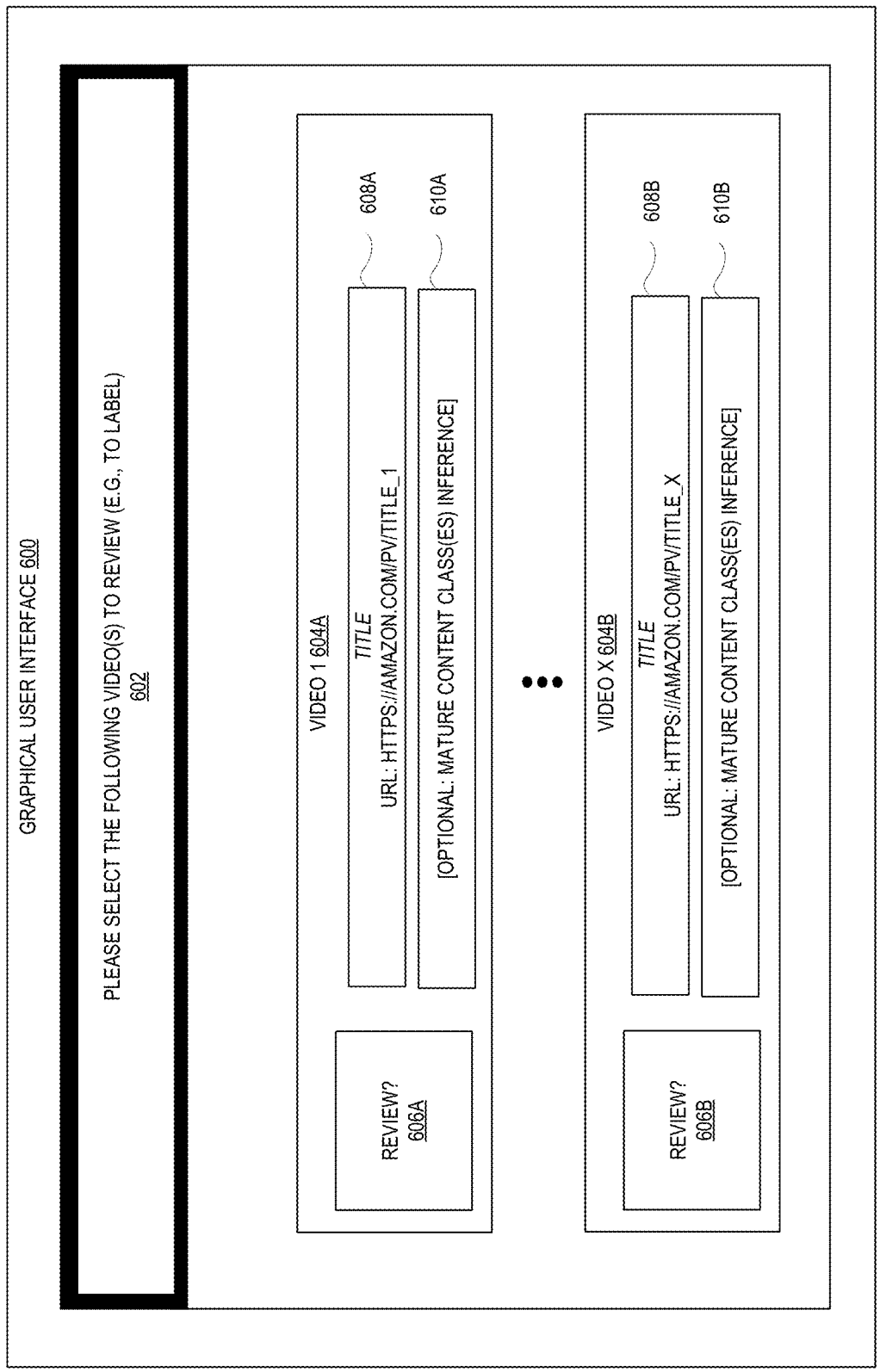
FIG. 6 is a diagram illustrating a graphical user interface for review (e.g., labeling) of an entire video according to some embodiments.
Figure 7:
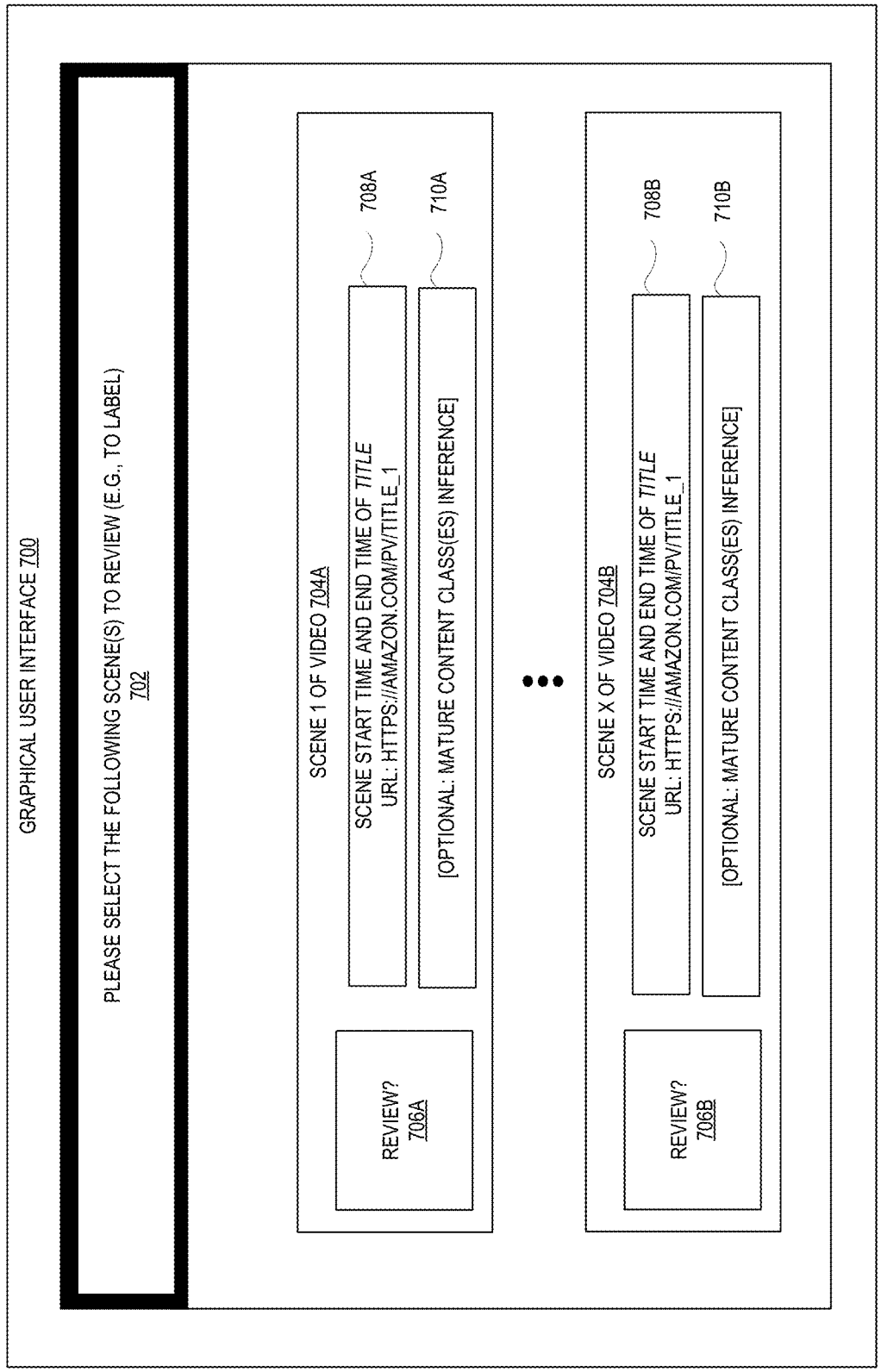
FIG. 7 is a diagram illustrating a graphical user interface for review (e.g., labeling) of one or more scenes of a single video according to some embodiments.

In one embodiment, display and/or audio output 120 is to present GUI 116 to a user of the device 112, e.g., GUI as discussed in reference to FIG. 5, 6, or 7. For example, where the GUI presents to the user a query of skipping one or more scenes (e.g., or other proper subset) of the media file that were identified by the content detector 122 as having certain (e.g., mature) content. The choice of what categories, etc., to be presented to the user may be by the content delivery provider. In response to a response to skip one of more scenes (e.g., or other proper subset) of the media file that were identified by the content detector 122 as having certain (e.g., mature) content, the media file (e.g., fragments) sent to the device 112 do not include the one of more scenes (e.g., or other proper subset) of the media file that were identified by the content detector 122 as having certain (e.g., mature) content (or the one of more scenes (e.g., or other proper subset) of the media file that were identified by the content detector 122 as having certain (e.g., mature) content are not played by media player 114).

In certain embodiments, content detector 122 uses machine learning model 124 (and/or is a machine learning powered service) that makes it easy to classify a media file (e.g., video and/or audio) as having mature (e.g., adult) content or not having mature content (e.g., according to a mature content class of classes). Mature content may be according to a standard of a Motion Picture Association (MPA) film rating system, e.g., classifying a video according to one of a G—General Audiences rating (e.g., All ages admitted. Nothing that would offend parents for viewing by children.) a PG—Parental Guidance Suggested rating (e.g., Some material may not be suitable for children. Parents urged to give "parental guidance". May contain some material parents might not like for their young children.), a PG-13—Parents Strongly Cautioned rating (e.g., Some material may be inappropriate for children under 13. Parents are urged to be cautious. Some material may be inappropriate for pre-teenagers.), an R—Restricted rating (e.g., Under 17 requires accompanying parent or adult guardian. Contains some adult material. Parents are urged to learn more about the film before taking their young children with them.), and NC-17—Adults Only (e.g., No One 17 and Under Admitted. Clearly adult. Children are not admitted.). In certain embodiments, content detector 122 is to identify (e.g., using machine learning model 124) a class or classes of certain (e.g., mature) content in a file being analyzed. A class may include one or more of the following (e.g., mature content) classes: sexually explicit content, violent or graphic content, dangerous or unlawful content, hateful content, harassment or cyberbullying content, or any combination thereof. Machine learning model 124 may identify particular frames (e.g., scenes) that are inferred to have mature content, e.g., so that they can be removed from being displayed by device 112 (e.g., as an instance of computing device 1300 in FIG. 13).

Figure 2:
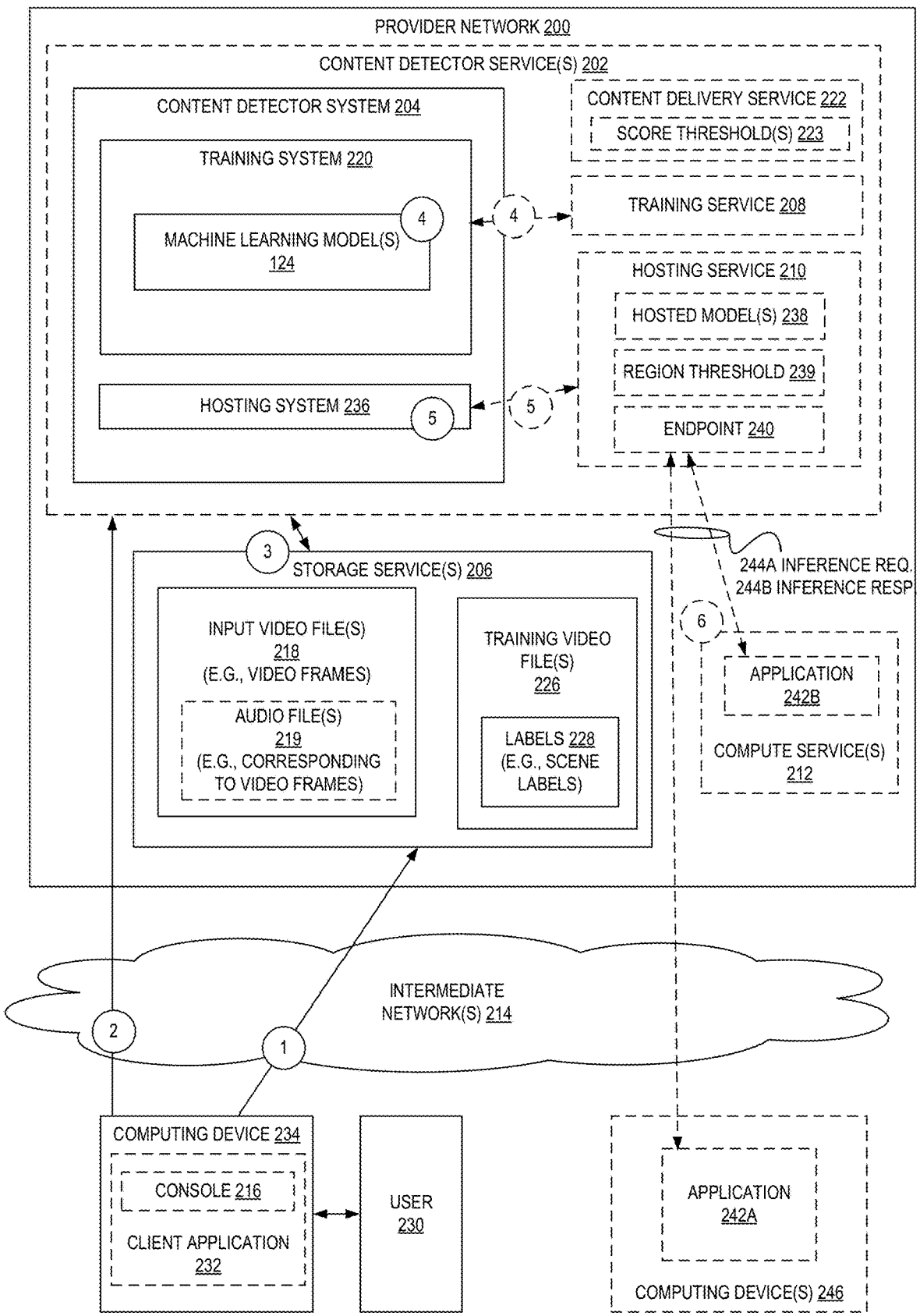
FIG. 2 is a diagram illustrating an environment for creating, training, and using models of a content detector service according to some embodiments.

FIG. 2 is a diagram illustrating an environment for creating, training, and using models of a content detector service 202 according to some embodiments. FIG. 2 includes a content detector system 204, one or more storage services 206, one or more training services 208, one or more hosting services 210, one or more compute services 212, and one or more content delivery services 222 implemented within a multi-tenant provider network 200. Each of the content detector service 202, one or more storage services 206, one or more training services 208, one or more hosting service 210, one or more compute services 212, and one or more content delivery services 222 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 212), a storage service 206 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 214 (e.g., the internet) via one or more interface(s), such as through use of application programming interface (API) calls, via a console 216 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 200 by an on-demand code execution service (which may be one of compute service(s) 212) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some embodiments, these resources may be maintained in a "ready" state (e.g., having a pre-initialized runtime environment configured to execute the serverless functions), allowing the serverless functions to be executed in near real-time.

The content detector service 202, in some embodiments, is a machine learning powered service that makes it easy for users to detect certain (e.g., mature) content. In some embodiments, the content detector service 202—via use of training service 208— allows users to build and use models to perform content detection tasks (e.g., on one or more input video file(s) 218 and/or one or more (e.g., corresponding) audio file(s) 219). In some embodiments, the content detector service 202 (e.g., training system 220) trains and uses a machine learning model 124.

The training system 220, for example, may enable users to generate a machine learning model 124 that infers certain (e.g., mature) content (e.g., a probability of such content and an indication of the corresponding subset of the input file) in one or more input video file(s) 218 and/or one or more (e.g., corresponding) audio file(s) 219. In certain embodiments, the machine learning model 124 utilizes one or more components depicted in FIG. 3.

Embodiments herein allow a customer to create machine learning model 124 by supplying training video file(s) 226 (e.g., including labels 228 that indicate a (e.g., mature content) class for certain scenes, e.g., as scene labels, and that indicate a (e.g., mature content) class for certain titles, e.g., title-level labels).

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 230 may provide or otherwise identify a training dataset 226 with labels 228 (e.g., media (e.g., video) file and its corresponding mature content labels) for use in creating a model. For example, as shown at circle (1), the user 230 may utilize a client application 232 executed by a computing device 234 (e.g., a web-application implementing a console 216 for the provider network 200, a standalone application, another web-application of another entity that utilizes the content detector service 202 as a part of its backend, a database or mixed-SQL environment, etc.) to cause the computing device 234 to upload the training dataset 226 with labels 228 to a storage location (e.g., provided by a storage service 206 such as an object storage service of a provider network 200).

Thereafter, at circle (2) the computing device 234 may issue one or more requests (e.g., API calls) to the content detector service 202 that indicate the user's 230 desire to train a machine learning model 124. The request may be of a type that identifies which type of model is to be created, e.g., CreateContentDetector for creating a content detector machine learning model 124. The request may also include one or more of an identifier of a storage location or locations storing the training dataset 226 (e.g., an identifier of just the documents, an identifier of just the labels 228, an identifier associated with both the documents and labels, etc.), which may identify a storage location (e.g., via a Uniform Resource Locator (URL), a bucket/folder identifier, etc.) within the provider network 200 (e.g., as offered by a storage service 206) or external to the provider network 200, a format identifier of the dataset 226, a language identifier of the language of the dataset 226, labels 228, etc.

Responsive to receipt of the request, the training system 220 of the content detector service 202 is invoked and begins operations for training the corresponding type of model.

In some embodiments, the training at circle (4) of the machine learning model 124 includes use (at optional, dotted circle (4)) of a separate training service 208 of content detector service 202; similarly, the hosting system 236 may make use (at optional, dotted circle (5)) of a hosting service 210 of an content detector service 202 to deploy a model as a hosted model 238 in association with an endpoint 240 that can receive search requests from client applications 242A and/or 242B at circle (6), provide the inference requests 244A to the associated hosted model(s) 238, and provide search results 244B (e.g., predicted scene(s) including mature content, the class of mature content, etc.) back to applications 242A and/or 242B, which may be executed by one or more computing devices 246 outside of the provider network 200 or by one or more computing devices of a compute service 212 (e.g., hardware virtualization service, serverless code execution service, etc.) within the provider network 200.

FIG. 3 is a diagram illustrating a network architecture of a machine learning model 124 for content detection according to some embodiments. In certain embodiments, network architecture of machine learning model 124 takes frames 300 of a video file as input (e.g., each video frame and/or audio frame of a media file) and then outputs a frame-level (e.g., mature) content classification score 312 for each frame of the input (e.g., video) file and/or a video-level (e.g., mature) content classification score 314 of the input (e.g., video) file. In certain embodiments, each score of frame-level (e.g., mature) content classification scores 312 of the input (e.g., video) file and/or a video-level (e.g., mature) content classification score 314 of the input (e.g., video) file that is above a score threshold (e.g., score threshold(s) 223 in FIG. 2) is output as an inferred frame (e.g., plurality of frames forming a scene) and/or inferred title having mature content. In certain embodiments, each score of (e.g., mature) content classification scores 312 of the input (e.g., video) file is for a section having a plurality of frames of the input (e.g., video) file (e.g., a score for each video clip of a plurality of video clips of the input (e.g., video) file), for example, instead of at a per frame granularity.

In certain embodiments, the network architecture of the machine learning model 124 for content detection formulates content (e.g., mature content) as a weakly supervised temporal localization problem. In certain embodiments, the video-level classification score 314 is computed as an aggregation of frame level classification scores 312. In certain embodiments, network architecture of machine learning model 124 is a neural network that takes a video representation as input and finds the most relevant segments (e.g., mature content segments) by estimating a (e.g., mature) content score at each. In one embodiment, the video-level classification score 314 is derived by aggregating such scores 312 along the entire video.

In certain embodiments, the network architecture of a machine learning model 124 for content detection includes three main components: (1) convolutional neural networks (CNN) for visual and audio features, (2) video-level classification through aggregation of frame-level classification scores 312, and (3) localization of (e.g., mature) content through peak finding.

(1) Convolutional Neural Networks (CNN) for Visual and Audio Features

In certain embodiments, a CNN based feature extraction component may be one or more of three variations. The first variation extracts visual features from video-frames by feeding the frames to a pre-trained CNN. The second variation extracts audio features by applying a 1D convolutional network (ConvNet) on the log mel-frequency spectrum of the audio signals. Certain embodiments herein analyze visual features separately from audio features. Certain embodiments herein of a third variation combines the audio features and visual features, e.g., using multi-modal data fusion. In all three variations, the model may utilize fully connected (FC) layers to refine the feature representations.

Pre-trained CNN for Frame Representation. Certain embodiments herein utilize a CNN 302 that is trained (e.g., pre-trained) to extract visual features (e.g., of mature content) at a frame level. In one embodiment, the machine learning model extracts the image frames from video titles at 1 frame per second (FPS), feeds these frames into the CNN network 02, and then extract the last hidden layer (e.g., 2048 dimension) as the frame feature 304 (e.g., a feature vector). In certain embodiments, these features 304 are then passed to fully connected (FC) layers 306 and 308 (e.g., of 1024 and 512 neurons of two layers, respectively, of each component 306) with (e.g., rectified linear unit (ReLU)) activation functions to refine the feature representations in the network. Certain embodiments use one second temporal granularity, although other granularities are possible, e.g., a plurality of seconds.

Figure 4:
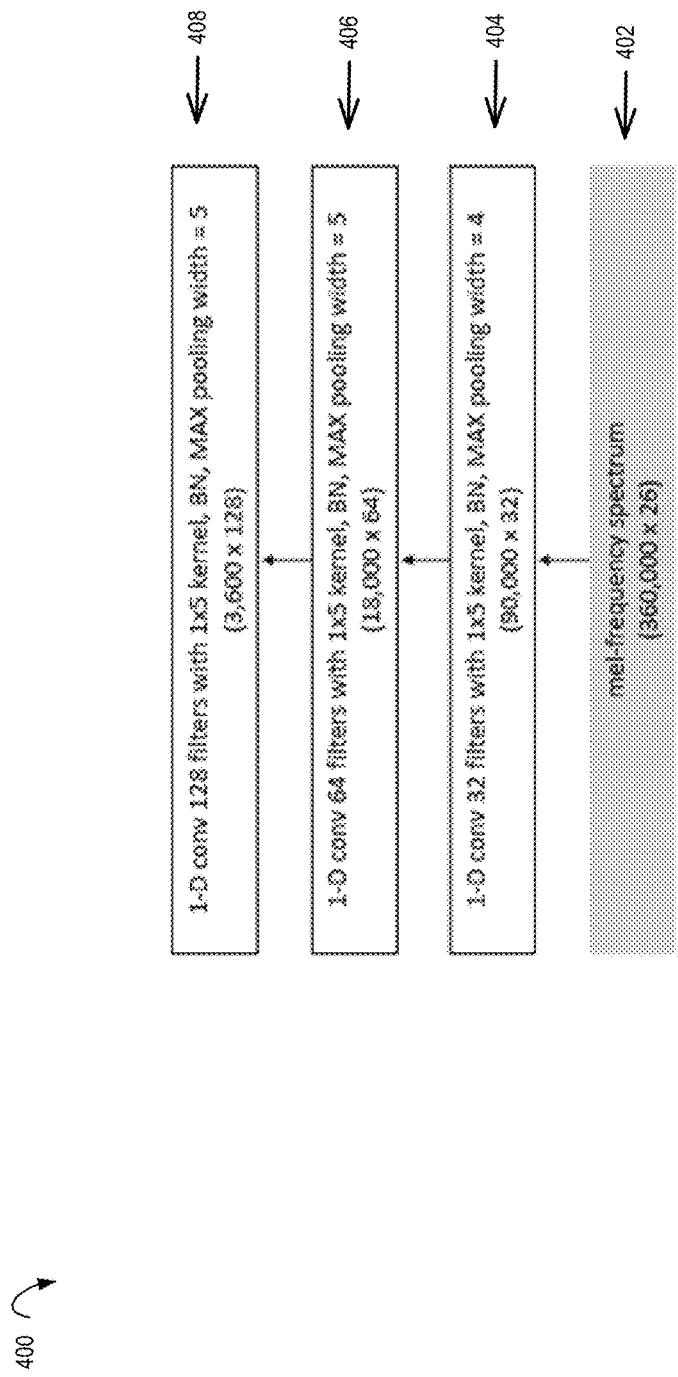
FIG. 4 is a diagram illustrating an architecture for 1D convolution for audio feature extraction according to some embodiments.

1D Convolution for Audio Representation. In certain embodiments, for the audio of a media file, the model is to first extract log-power mel-frequency spectrum with (e.g., 26) mel-scale filters from every (e.g., 25 milliseconds) window with (e.g., 10 milliseconds) shift between two consecutive windows. In one embodiment, the extracted log-mel spectrogram is passed through the 1D convolution network component to generate the audio features. FIG. 4 is a diagram illustrating an architecture 400 for 1D convolution for audio feature extraction according to some embodiments. In certain embodiments of FIG. 4, the architecture 400 of each layer 404, 406, and 408 of the 1D convolution network component has three modules, where each module consists of an 1D convolution, a batch normalization (BN), and a maximum (MAX) pooling layer. In certain embodiments, the three modules gradually aggregate the input mel-frequency spectrum (e.g., audio signal) 402 and results in a (e.g., 128 dimensional) feature vector as the output for each second of the signal as shown in FIG. 4. Similar to visual features, after the 1D Convolution based audio feature is extracted, it is passed to fully connected FC layers (e.g., 64 neurons) with (e.g., ReLU) activation to refine the feature representations in the network.

Audio-Visual Fusion. Turning back to FIG. 3, certain embodiments herein process the visual and audio features jointly in a signal neural network model, e.g., where each of features boxes 304 are a feature vector having both video features and audio features (e.g., for a particular frame of an audio/video media file), e.g., using a multi-modal fusion technique to combine the two data modalities. In certain embodiments, the visual feature vector from the (e.g., pretrained) CNN has more elements (e.g., dimensions) than the 1D convolution based audio feature (e.g., 2048 vs 128 dimension). In certain embodiments, the visual features are concatenated with the audio features, e.g., the visual features for a frame concatenated with the audio features from the 1D ConvNet (e.g., 128 dimension) after the two aforementioned FC layers 306, 308 (e.g., the 128 audio dimension audio features concatenated with the 512 dimension video features). In certain embodiments, both the audio and video feature spaces are constructed over the same (e.g., 1 second) temporal scale. In certain embodiments, this converts each second of a video into a multiple (e.g., 640 dimensional) vector which is passed to a FC layer (e.g., 512 neuros) with (e.g., ReLU) activation function to refine the feature representations in the network.

(2) Video-Level Classification Through Aggregation of Frame-Level Classification Scores Video-Level Classification. In certain embodiments, once the features (e.g., features 304) are extracted from the sampled video, they are fed into the network architecture of the machine learning model 124 shown in FIG. 3 to classify whether a video contains mature content (e.g., sexually explicit content) or not. In certain embodiments, the representation output is passed to two separate branches, e.g., labeled 1 and 2 in FIG. 3. In certain embodiments, the first branch (labeled 1) of 310 contains an attention layer with one neuron to learn the class-agnostic importance of each frame, and the output of the attention layer is between 0 and 1. In certain embodiments, the second branch (labeled 2) of 310 has a FC layer with two neurons and (e.g., softmax) activation function to learn the binary (e.g., 1 for true or 0 for false) (e.g., mature) content classification scores for each frame. In certain embodiments, the outputs from the two branches are aggregated to compute the video-level classification score 312 for each frame. In one embodiment, the class-agnostic attention values 316 are used as the weights in computing the frame-level class-specific activation scores 312. For example, let $s_t$ (e.g., from branch path "2" in 310) be the two-dimensional classification score at frame t, and $\lambda_t$ (e.g., from branch path "1" in 310) be the corresponding attention weight. In certain embodiments, the video-level classification score s 314 is calculated as the attention weighted average of the frame-level classification scores st, e.g., $$s = \sum_{t=1}^{T} \lambda_t s_t,$$

where T is the number of frames in the video.

Attention Layer. Certain embodiments herein use an attention layer to extract the most related frames to the targeted actions. An attention layer 310 may perform sigmoid-based attention or softmax based attention. For example, let $x_t$ (e.g., as input to the branches) (for example, the output of layer 306, e.g., as several hundreds of neurons) be the refined feature representation, which is first fed to a fully connected (FC) layer with its output denoted as $f_t$. In certain embodiments, the attention weight with softmax function is:

$$\lambda_t = \frac{e^{f_t}}{\sum_{t=1}^{T} e^{f_t}}.$$

However, the problem of such an activation function in certain embodiments is that its values could be dominated by one or two strong scoring (e.g., for mature content) scenes. In particular, since the transformation $e_{f_t}$ is exponential, which is unbounded, a strong scoring (e.g., for mature content) scene can end up with a very large $\lambda_t$ at its frames, leading to relative low weights to other (e.g., mature content) scenes from the same title. As an example, if the ratio of two $f_t$ values at two different frames is 5, after the exponential transformation, their ratio becomes 55. As a consequence, this tends to make the attention too sparse. To address this issue, certain embodiments herein use sigmoid based activation function (e.g., in attention layer 310) to balance the impact of strong and weak scenes, e.g., as $$\lambda_t = \frac{e^{f_t}}{1 + e^{f_t}}.$$

However, since there is no normalization across the whole video, the standard sigmoid activation function may not work when the video length varies in the data. For example, a movie is typically at least twice as long as (e.g., television) episodes. Because of this, movies may tend to have a much larger video level score than an episode because the frame count (T) is much larger for movies. To solve this problem, certain embodiments herein utilize (e.g., in attention layer 310) a new activation function which combines the advantages of both sigmoid and softmax attention. In particular, instead of using the unbounded values in softmax formula, embodiments herein normalize it with the sigmoid values which is bounded by 1. In this way, the normalized sigmoid based attention value is determined as follows:

$$\hat{\lambda}_t = \frac{e^{f_t}}{1+e^{f_t}},$$

$$\lambda_t = \frac{\hat{\lambda}_t}{\sum_{t=1}^{T} \hat{\lambda}_t}.$$

This modified sigmoid attention may be used as the sigmoid attention discussed herein (e.g., as sigmoids in 310 in FIG. 3).

Loss Function with Sparsity. In certain embodiments, the loss function used (e.g., in training) includes two terms and can be written as:

$$L = L_c + \alpha L_s$$

where Lc is the classification loss 318 and Ls is the sparsity loss 320. In certain embodiments, Lc 318 is a cross entropy binary classification loss between video-level classification score s and the video level output (e.g., video-level mature content classification(s)) from a data labeling model (e.g., service). In certain embodiments, the Ls 320 is applied as the L1 norm of the attention weights $\|\lambda\|1$ to eliminate irrelevant video content and encourage sparse subset of certain (e.g., mature content) scenes.

(3) Localization of (e.g., Mature) Content Through Peak Finding

Class Activation Curve. In certain embodiments, to localize the important regions of the targeted action, e.g., mature content activity for certain uses, a one-dimensional class-specific activation curve in the temporal domain is utilized. Formally, let k be the k-th class and $s^k$ be the k-th class probability score at the video-level. Thus, $s^k$ may be computed as:

$$s^k = \sum_{t=1}^{T} \lambda_t s_t^k,$$

And, the class-specific activation value $a^k_t$ at frame t in the temporal domain can be computed as:

$$a_t^k = \lambda_t s_t^k,$$

Where the value $a^k_t$ indicates the relevance of frame to each class k (e.g., mature content class) at frame t.

Region Localization from Activation Curve. In certain embodiments, to localize the mature content region (e.g., in a single video), a threshold-based approach is used to generate the region proposal. In certain embodiments, a threshold is applied to the activation vector $a^k$ to find all frames above the determined threshold (e.g., region threshold 239 in FIG. 2), and then any consecutive frames above the threshold form a region proposal. In certain embodiments, each proposed region is assigned with a proposal score, given by the average of activation values $a^k_t$ of all the frames within the region. In certain embodiments, the region proposals are combined next to each other (e.g., one frame away) to smooth out the proposals.

Thus, certain embodiments herein are directed to an end-to-end deep learning model for localization of mature content in (e.g., long) videos by leveraging CNN, FC layers, and an improved sigmoid attention mechanism in a unified framework. Embodiments herein use CNNs to extract visual and audio features from sampled frames of videos (e.g., "titles"), feed the features into FC layers to detect frame-level mature content scores, and then use the attention with a sparsity loss to aggregate the video-level classification score. Certain embodiments herein do not rely on the strongly labeled dataset for training and are computationally efficient. Embodiments herein allows a machine learning model to cover more action scenes simultaneously and improves the recall significantly. Although mature content is discussed, embodiments herein can also be applied to other applications, e.g., those with only weak labeling.

Once potential (e.g., probable) content (e.g., mature content) is detected (e.g., inferred by the machine learning model) in a media (e.g., video) file, embodiments herein allow for certain actions to be taken. For example, in one embodiment, one or more queries may be (e.g., automatically) generated based at least in part on the potential (e.g., probable) content (e.g., mature content) being detected (e.g., inferred by the machine learning model), for example, based on a plurality of frame-level (e.g., mature) content classification scores of an input media (e.g., video) file or the video-level (e.g., single video level) (e.g., mature) content classification score of the input media (e.g., video) file.

FIG. 5 is a diagram illustrating a graphical user interface 500 for scene skipping according to some embodiments. Depicted graphical user interface 500 includes a field 502 that is customizable with text to indicate that the user is to take an action (e.g., "Please select the following scene(s) to skip"). Graphical user interface 500 includes a plurality of entries 504A-B and each entry includes a field 508A-B that is customizable with text to indicate a warning (e.g., "This scene may contain mature content"), optionally may include the particular class or classes of mature content in that scene, and a skip interface element 506A-B that, when selected, will cause that corresponding scene to be skipped. Although two entries are shown, any plurality of entries may be utilized (e.g., where "X" is any positive integer greater than one). A user may click the submit interface element 510 to cause those scenes to be skipped, e.g., to cause the skip response(s) to be sent (e.g., as skip responses in FIG. 1 to content delivery system 102 to then cause the skip). An interface element, may include, but is not limited to, a thumbs up (or down), checkbox, button, dropdown menu, etc. Title(s) and/or scene(s) (e.g., with mature content) may be those detected (e.g., inferred) by the machine learning model(s) disclosed herein.

Additionally or alternatively, a graphical user interface may be provided for review (e.g., labeling) of videos (e.g., scenes thereof). For example, title(s) and/or scene(s) (e.g., with mature content) may be those detected (e.g., inferred) by the machine learning model(s) disclosed herein.

(1) Those results can be used to select a collection of titles for (e.g., manual) auditing. Assume there is a large set of video titles, embodiments of the model herein can help to prioritize the titles with higher (e.g., mature) content scores, and/or de-prioritize those with lower scores in this set, e.g., leading to better operation efficiency and is especially useful when the operation resource is limited compared to the volume of titles to be audited.

(2) Those results can be used to speed up the scene-level (e.g., manual) auditing of a specific video file (e.g., title). For example, the identified (e.g., mature) content scenes found by the model can be presented to the operators to review first.

In certain embodiments, the accuracy of detection is improved by first getting an over-complete candidate set of scenes (e.g., clips) most likely containing the class of (e.g., mature) content using the trained machine learning model(s) disclosed herein, and then passing these scenes (e.g., clips) to a binary (e.g., mature) content classifier trained in a more targeted and supervised manner That is, using weak-labels and the disclosed machine learning model(s) for likely localization followed by a more direct two-class classification.

FIG. 6 is a diagram illustrating a graphical user interface 600 for review (e.g., labeling) of an entire video according to some embodiments. Depicted graphical user interface 600 includes a field 602 that is customizable with text to indicate that the user (e.g., reviewer instead of an end customer of a content delivery service) is to take an action (e.g., "Please select the following video(s) to review"). Graphical user interface 600 includes a plurality of entries 604A-B and each entry includes a field 608A-B that is customizable with text to indicate a title of the video file, optionally may include a link to the video file (e.g., URL), and optionally may include a field 610A-B that indicates the particular class or classes of mature content in that video, and a review interface element 606A-B that, when selected, causes that corresponding video to be displayed (e.g., for labeling). Although two entries are shown, any plurality of entries may be utilized (e.g., where "X" is any positive integer greater than one). An interface element, may include, but is not limited to, a thumbs up (or down), checkbox, button, dropdown menu, etc. Title(s) (e.g., with mature content) may be those detected (e.g., inferred) by the machine learning model(s) disclosed herein.

FIG. 7 is a diagram illustrating a graphical user interface 700 for review (e.g., labeling) of one or more scenes of a single video according to some embodiments. Depicted graphical user interface 700 includes a field 702 that is customizable with text to indicate that the user (e.g., reviewer instead of an end customer of a content delivery service) is to take an action (e.g., "Please select the following scene(s) to review"). Graphical user interface 700 includes a plurality of entries 704A-B and each entry includes a field 708A-B that is customizable with text to indicate the scene (e.g., a start time and/or end time) and/or a title of the video file, optionally may include a link to the video file (e.g., URL), and optionally may include a field 710A-B that indicates the particular class or classes of mature content in that scene, and a review interface element 706A-B that, when selected, causes that corresponding scene to be displayed (e.g., for labeling). Although two entries are shown, any plurality of entries may be utilized (e.g., where "X" is any positive integer greater than one). An interface element, may include, but is not limited to, a thumbs up (or down), checkbox, button, dropdown menu, etc. Scene(s) (e.g., with mature content) may be those detected (e.g., inferred) by the machine learning model(s) disclosed herein.

Figure 8:
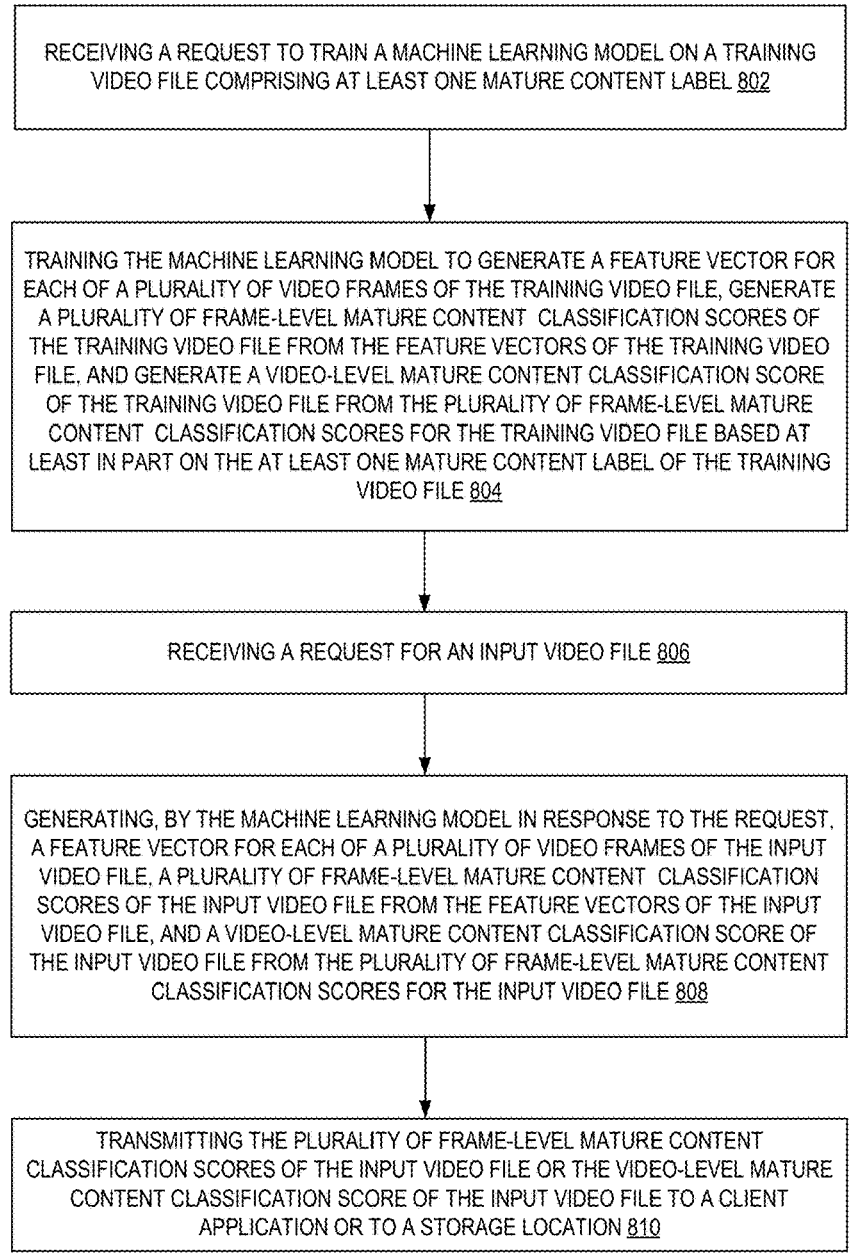
FIG. 8 is a flow diagram illustrating operations of a method for training and using a machine learning model for detection of possible mature content according to some embodiments.

FIG. 8 is a flow diagram illustrating operations 800 of a method for training and using a machine learning model for detection of possible mature content according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by content delivery system/service of the other figures.

The operations 800 include, at block 802, receiving a request to train a machine learning model on a training video file comprising at least one mature content label. The operations 800 further include, at block 804, training the machine learning model to generate a feature vector for each of a plurality of video frames of the training video file, generate a plurality of frame-level mature content classification scores of the training video file from the feature vectors of the training video file, and generate a video-level mature content classification score of the training video file from the plurality of frame-level mature content classification scores for the training video file based at least in part on the at least one mature content label of the training video file. The operations 800 further include, at block 806, receiving a request for an input video file. The operations 800 further include, at block 808, generating, by the machine learning model in response to the request, a feature vector for each of a plurality of video frames of the input video file, a plurality of frame-level mature content classification scores of the input video file from the feature vectors of the input video file, and a video-level mature content classification score of the input video file from the plurality of frame-level mature content classification scores for the input video file. The operations 800 further include, at block 810, transmitting the plurality of frame-level mature content classification scores of the input video file or the video-level mature content classification score of the input video file to a client application or to a storage location.

Figure 9:
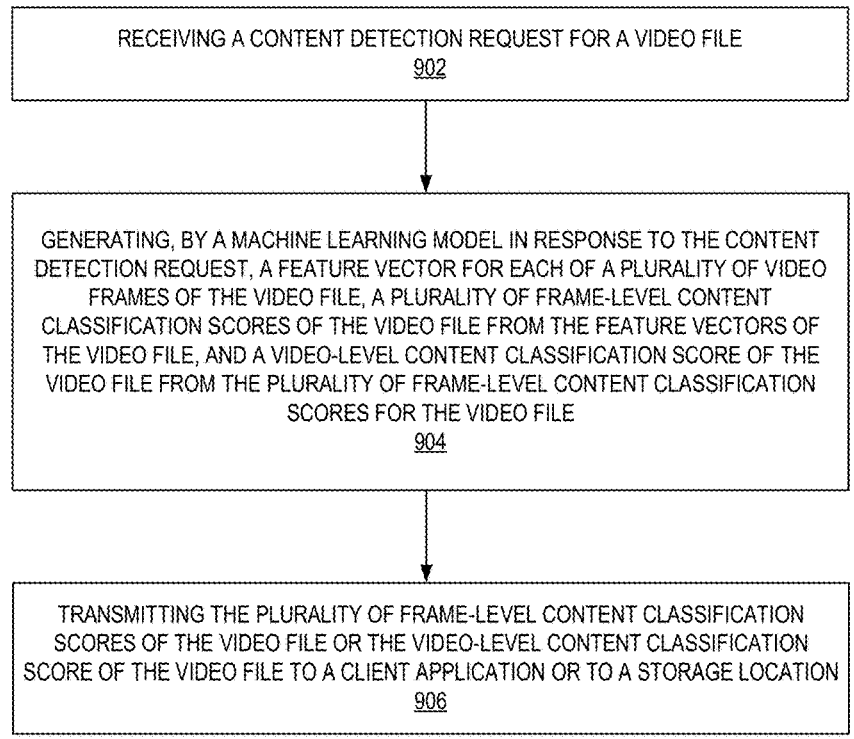
FIG. 9 is a flow diagram illustrating operations of a method for training and using a machine learning model for detection of possible content according to some embodiments.

FIG. 9 is a flow diagram illustrating operations of a method for training and using a machine learning model for detection of possible content according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by a provider network of the other figures.

The operations 900 include, at block 902, receiving a content detection request for a video file. The operations 900 further include, at block 904, generating, by a machine learning model in response to the content detection request, a feature vector for each of a plurality of video frames of the video file, a plurality of frame-level content classification scores of the video file from the feature vectors of the video file, and a video-level content classification score of the video file from the plurality of frame-level content classification scores for the video file. The operations 900 include, at block 906, transmitting the plurality of frame-level content classification scores of the video file or the video-level content classification score of the video file to a client application or to a storage location.

Exemplary environments, systems, etc. that the above may be used in are detailed below.

At least some embodiments of the disclosed technologies can be described in view of the following examples:

Example 1. A computer-implemented method comprising:
  receiving a request to train a machine learning model on a training video file comprising at least one mature content label;
  training the machine learning model to generate a feature vector for each of a plurality of video frames of the training video file, generate a plurality of frame-level mature content classification scores of the training video file from the feature vectors of the training video file, and generate a video-level mature content classification score of the training video file from the plurality of frame-level mature content classification scores for the training video file based at least in part on the at least one mature content label of the training video file;
  receiving a request for an input video file;
  generating, by the machine learning model in response to the request, a feature vector for each of a plurality of video frames of the input video file, a plurality of frame-level mature content classification scores of the input video file from the feature vectors of the input video file, and a video-level mature content classification score of the input video file from the plurality of frame-level mature content classification scores for the input video file; and
  transmitting the plurality of frame-level mature content classification scores of the input video file or the video-level mature content classification score of the input video file to a client application or to a storage location.

Example 2. The computer-implemented method of example 1, wherein the training the machine learning model to generate the feature vector for each of a plurality of video frames of the training video file comprises generating the feature vector that comprises video features and audio features for corresponding audio of the plurality of video frames of the training video file.

Example 3. The computer-implemented method of example 1, further comprising:
  displaying, via a graphical user interface to a prospective viewer of the input video file, a skip query for a scene of the input video file having at least one frame-level mature content classification score that exceeds a score threshold;
  receiving an indication from the prospective viewer via the graphical user interface to skip the scene; and
  causing skipping of the scene to a following scene when the input video file is viewed by the prospective viewer.

Example 4. A computer-implemented method comprising:
  receiving a content detection request for a video file;
  generating, by a machine learning model in response to the content detection request, a feature vector for each of a plurality of video frames of the video file, a plurality of frame-level content classification scores of the video file from the feature vectors of the video file, and a video-level content classification score of the video file from the plurality of frame-level content classification scores for the video file; and
  transmitting the plurality of frame-level content classification scores of the video file or the video-level content classification score of the video file to a client application or to a storage location.

Example 5. The computer-implemented method of example 4, wherein the generating the feature vector for each of the plurality of video frames of the video file comprises generating the feature vector that comprises video features and audio features for corresponding audio of the plurality of video frames of the video file.

Example 6. The computer-implemented method of example 5, where the video features are concatenated with the audio features in the feature vector.

Example 7. The computer-implemented method of example 4, wherein the classification scores indicate a likelihood of sexually explicit content.

Example 8. The computer-implemented method of example 4, wherein the generating the plurality of frame-level content classification scores of the video file from the feature vectors of the video file by the machine learning model comprises sending the feature vector to a first branch of the machine learning model that determines a class-agnostic attention value for each of the plurality of video frames of the video file, and a second branch of the machine learning model that determines a binary classification score for each of the plurality of video frames of the video file.

Example 9. The computer-implemented method of example 8, wherein the video-level content classification score of the video file by the machine learning model is a sum of each resultant of a multiplication of the class-agnostic attention value for a frame of the plurality of video frames of the video file by the binary classification score of the frame.

Example 10. The computer-implemented method of example 4, further comprising:
  displaying, via a graphical user interface to a viewer of the video file, a skip query for a scene of the video file having at least one frame-level classification score that exceeds a score threshold;
  receiving an indication from the viewer via the graphical user interface to skip the scene; and
  causing skipping of the scene to a following scene when the video file is viewed by the viewer.

Example 11. The computer-implemented method of example 10, wherein the causing the skipping of the scene comprises removing the scene from the video file before delivering at least a corresponding subset of the video file to the viewer.

Example 12. The computer-implemented method of example 10, wherein the displaying the skip query begins after viewing of the video file by the viewer has begun.

Example 13. The computer-implemented method of example 4, further comprising displaying, via a graphical user interface, an indication of the video file when the video-level content classification score exceeds a score threshold.

Example 14. The computer-implemented method of example 4, further comprising displaying, via a graphical user interface, an indication of a scene of the video file having at least one frame-level classification score that exceeds a score threshold.

Example 15. A system comprising:
  one or more electronic devices to implement a storage service to store a video file; and
  one or more electronic devices to implement a content detector service, the content detector service including instructions that upon execution cause the content detector service to perform a method comprising:

receiving a content detection request for the video file;
generating, by a machine learning model in response to the content detection request, a feature vector for each of a plurality of video frames of the video file, a plurality of frame-level content classification scores of the video file from the feature vectors of the video file, and a video-level content classification score of the video file from the plurality of frame-level content classification scores for the video file; and
transmitting the plurality of frame-level content classification scores of the video file or the video-level content classification score of the video file to a client application or to a storage location.

Example 16. The system of example 15, wherein the instructions upon execution cause the content detector service to perform operations wherein the generating the feature vector for each of the plurality of video frames of the video file comprises generating the feature vector that comprises video features and audio features for corresponding audio of the plurality of video frames of the video file.

Example 17. The system of example 15, wherein the instructions upon execution cause the content detector service to perform operations wherein the generating the plurality of frame-level content classification scores of the video file from the feature vectors of the video file by the machine learning model comprises sending the feature vector to a first branch of the machine learning model that determines a class-agnostic attention value for each of the plurality of video frames of the video file, and a second branch of the machine learning model that determines a binary classification score for each of the plurality of video frames of the video file.

Example 18. The system of example 15, wherein the instructions upon execution cause the content detector service to further perform operations comprising:
displaying, via a graphical user interface to a viewer of the video file, a skip query for a scene of the video file having at least one frame-level classification score that exceeds a score threshold;
receiving an indication from the viewer via the graphical user interface to skip the scene; and causing skipping of the scene to a following scene when the video file is viewed by the viewer.

Example 19. The system of example 15, wherein the instructions upon execution cause the content detector service to further perform operations comprising displaying, via a graphical user interface, an indication of the video file when the video-level content classification score exceeds a score threshold.

Example 20. The system of example 15, wherein the instructions upon execution cause the content detector service to further perform operations comprising displaying, via a graphical user interface, an indication of a scene of the video file having at least one frame-level classification score that exceeds a score threshold.

Figure 10:
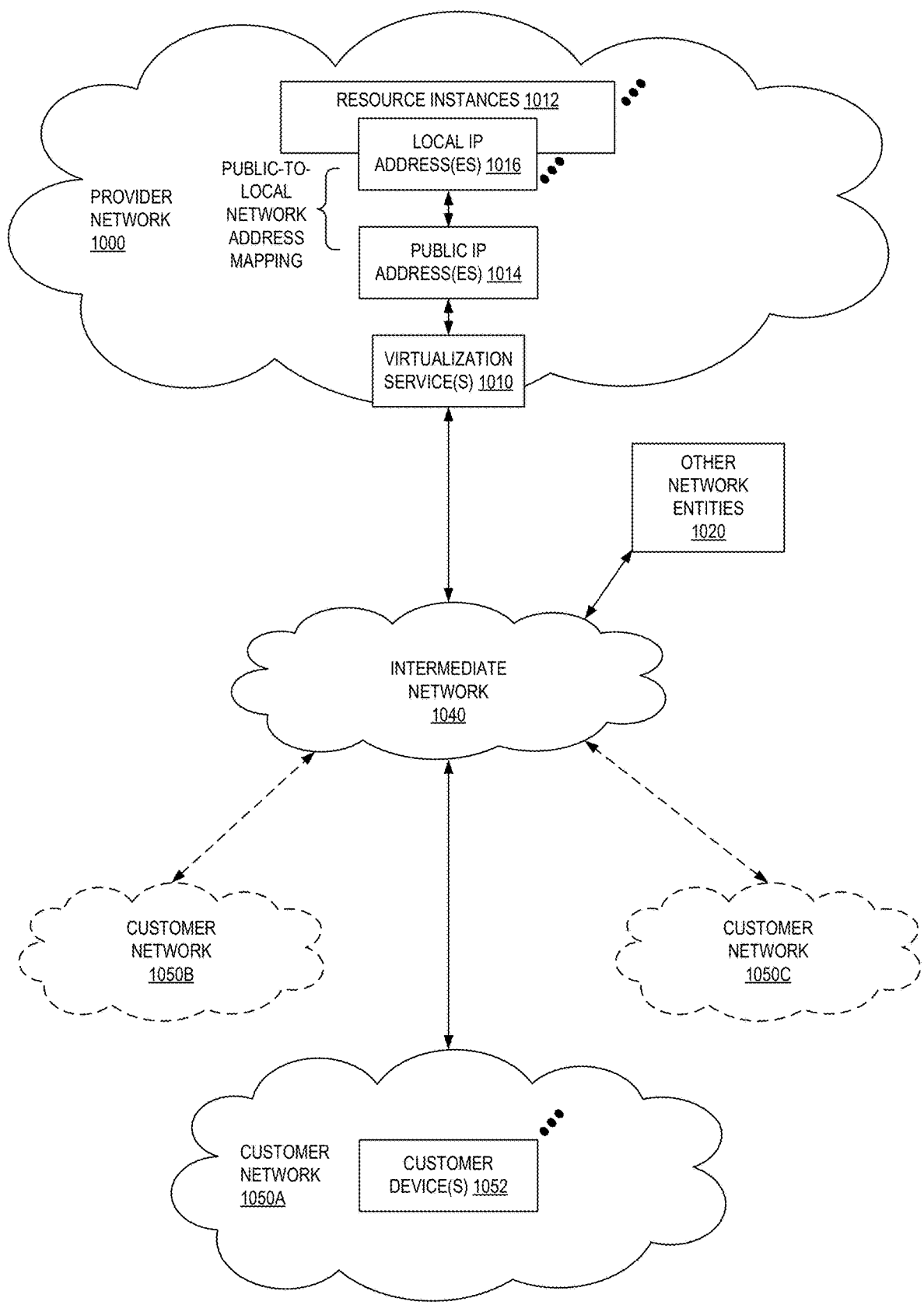
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
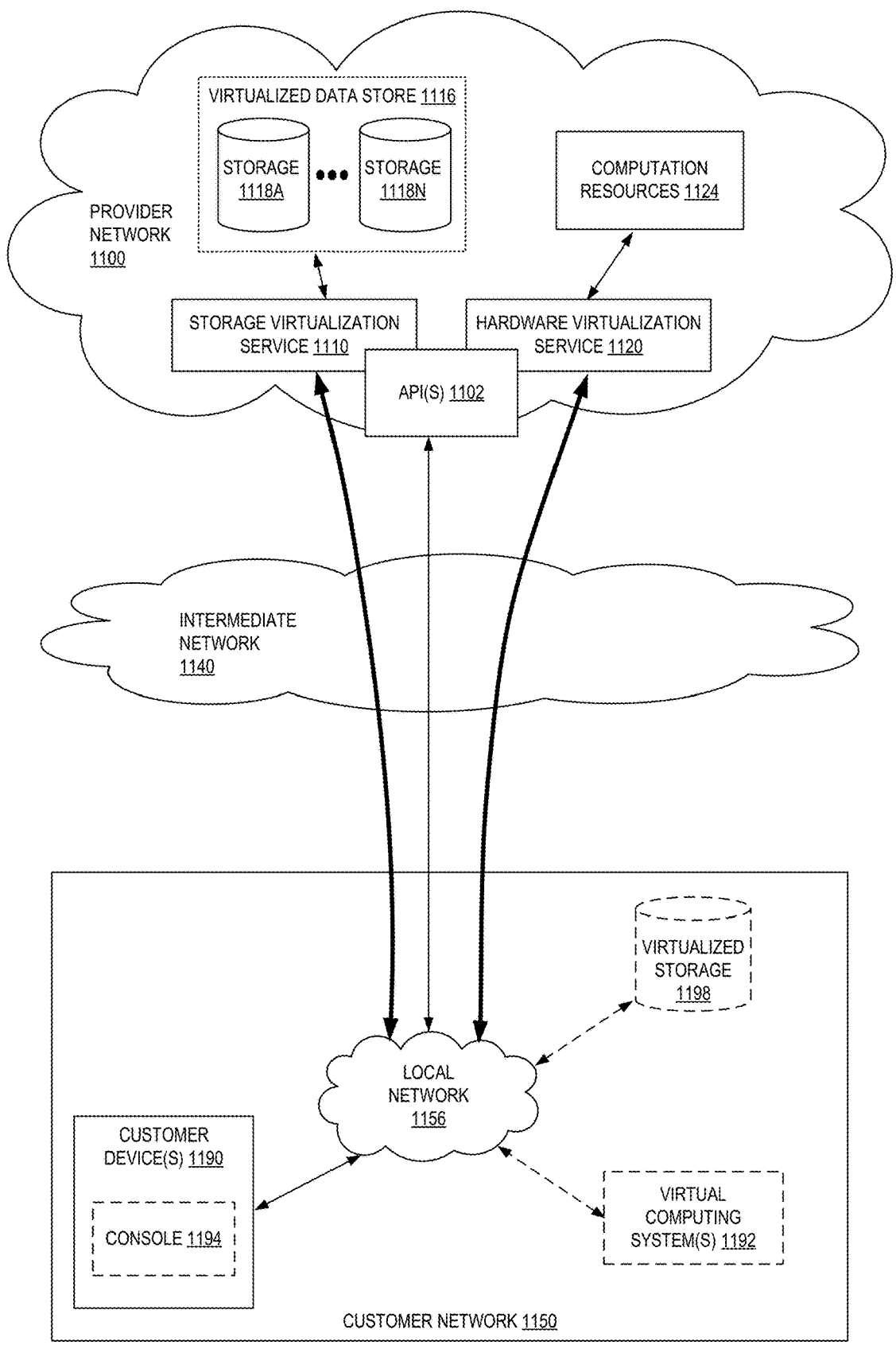
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
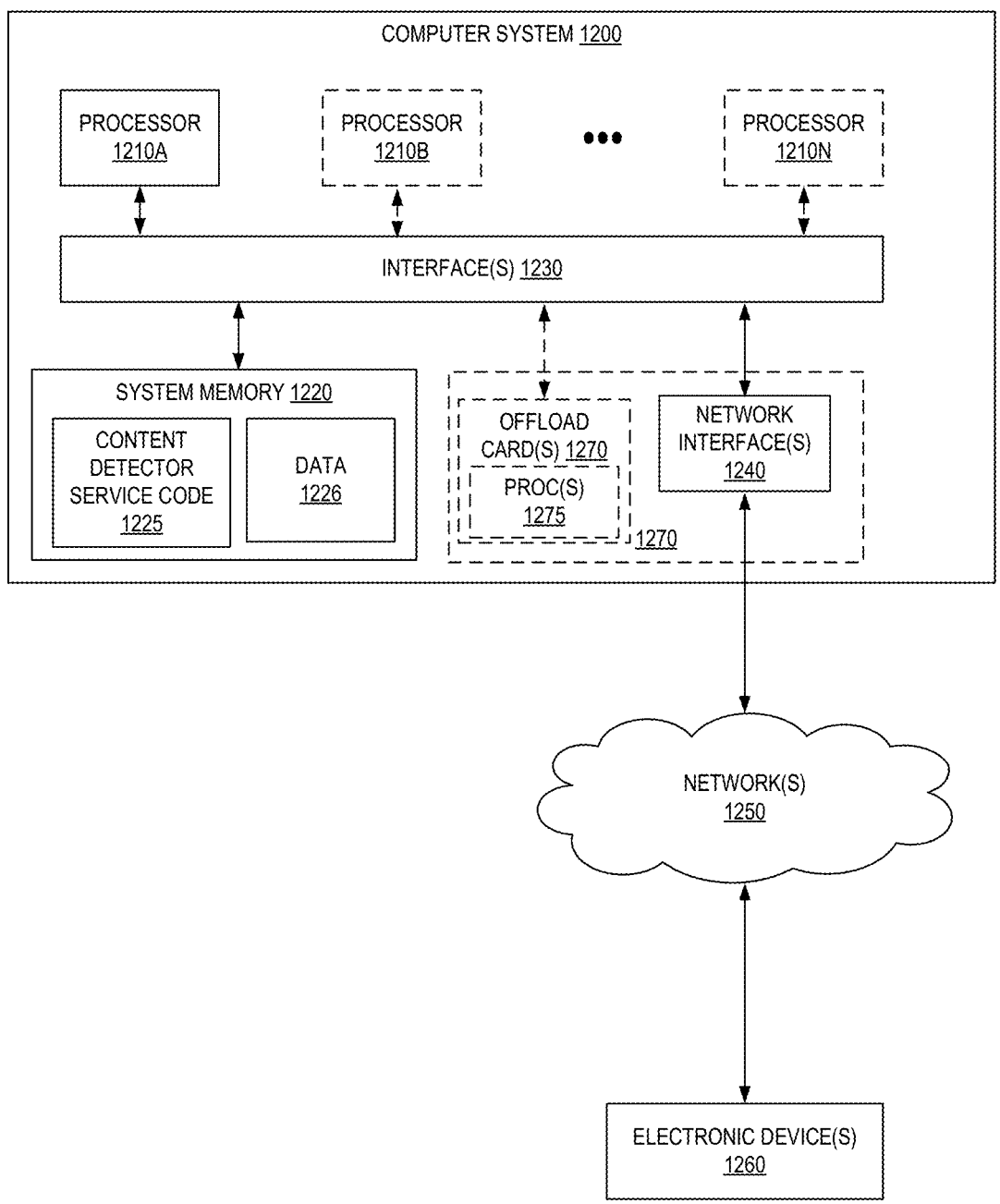
FIG. 12 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as content detector service code 1225 (e.g., and/or content delivery service code) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
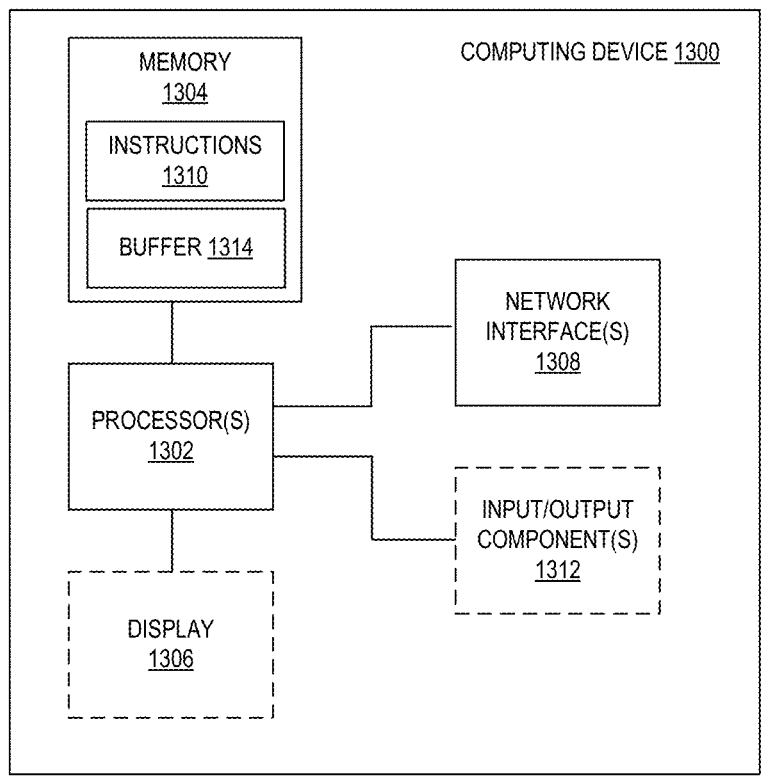
FIG. 13 illustrates a logical arrangement of a set of general components of an exemplary computing device that can be utilized in accordance with various embodiments.

FIG. 13 illustrates a logical arrangement of a set of general components of an example computing device 1300. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (for example, instructions 1310, e.g., which implement an anomaly detector as disclosed herein) and/or attribute data 1314 (e.g., generated by computing device 1300 for transmittal to an anomaly detector), and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1310) for execution on the set of one or more processors 1302 of that electronic device. One or more parts of various embodiments may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some embodiments include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 14:
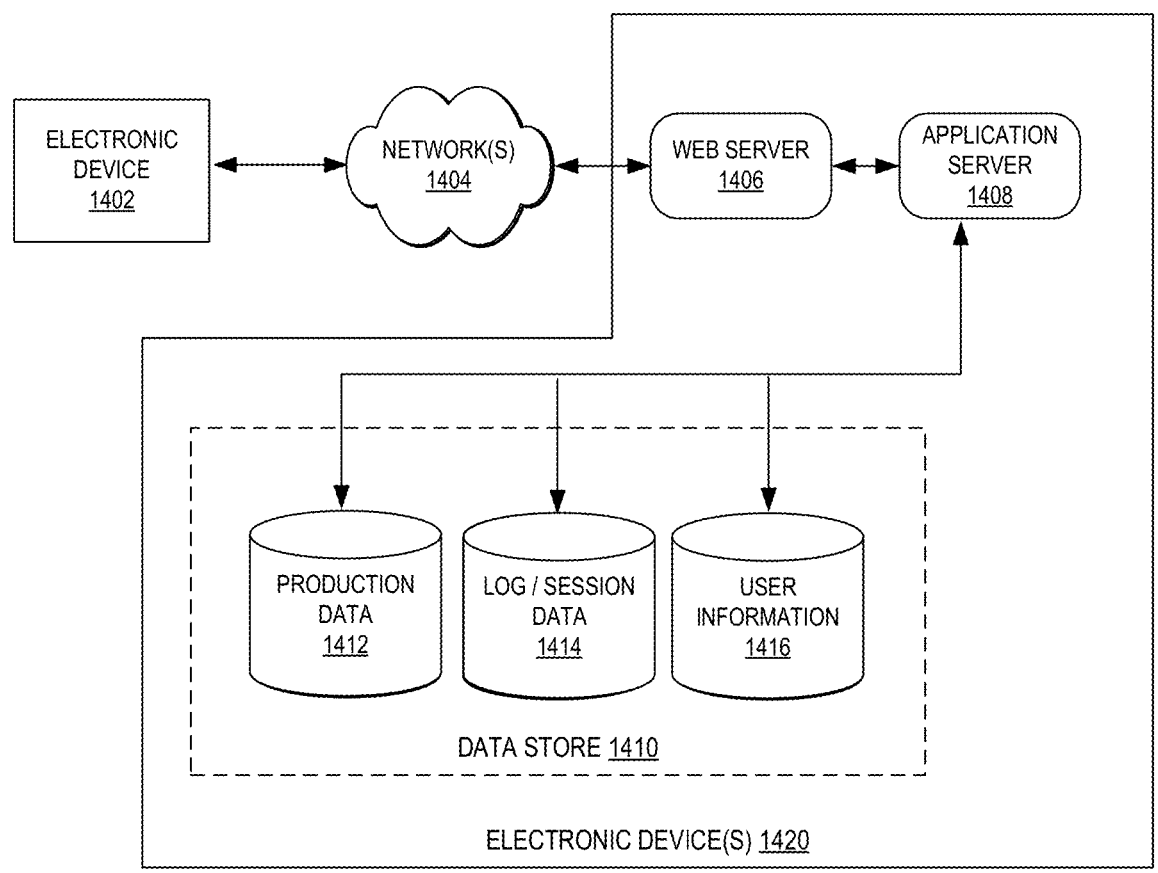
FIG. 14 illustrates an example of an environment for implementing aspects in accordance with various embodiments.

As discussed, different approaches can be implemented in various environments in accordance with the described embodiments. For example, FIG. 14 illustrates an example of an environment 1400 for implementing aspects in accordance with various embodiments. For example, in some embodiments messages are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various embodiments. The system includes an electronic client device 1402, which may also be referred to as a client device and can be any appropriate device operable to send and receive requests, messages or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to train a machine learning model on a training video file comprising at least one mature content label;
   training the machine learning model to generate a feature vector for each of a plurality of video frames of the training video file, generate a plurality of frame-level mature content classification scores of the training video file from the feature vectors of the training video file, and generate a video-level mature content classification score of the training video file from the plurality of frame-level mature content classification scores for the training video file based at least in part on the at least one mature content label of the training video file;
   receiving a request for an input video file;
   generating, by the machine learning model in response to the request:
      a feature vector for each of a plurality of video frames of the input video file,
      a plurality of frame-level mature content classification scores of the input video file from the feature vectors of the input video file by sending the feature vector to a first branch of the machine learning model that determines a class-agnostic attention value for each of the plurality of video frames of the input video file, and a second branch of the machine learning model that determines a binary classification score for each of the plurality of video frames of the input video file, and
      a video-level mature content classification score of the input video file from the plurality of frame-level mature content classification scores for the input video file that comprises a sum of each resultant of a multiplication of the class-agnostic attention value for a frame of the plurality of video frames of the input video file by the binary classification score of the frame; and
   transmitting the plurality of frame-level mature content classification scores of the input video file or the video-level mature content classification score of the input video file to a client application or to a storage location.

2. The computer-implemented method of claim 1, wherein the training the machine learning model to generate the feature vector for each of a plurality of video frames of the training video file comprises generating the feature vector that comprises video features and audio features for corresponding audio of the plurality of video frames of the training video file.

3. The computer-implemented method of claim 1, further comprising:
   displaying, via a graphical user interface to a prospective viewer of the input video file, a skip query for a scene of the input video file having at least one frame-level mature content classification score that exceeds a score threshold;
   receiving an indication from the prospective viewer via the graphical user interface to skip the scene; and
   causing skipping of the scene to a following scene when the input video file is viewed by the prospective viewer.

4. A computer-implemented method comprising:
   receiving a content detection request for a video file;
   generating, by a machine learning model in response to the content detection request:
      a feature vector for each of a plurality of video frames of the video file,
      a plurality of frame-level content classification scores of the video file from the feature vectors of the video file by sending the feature vector to a first branch of the machine learning model that determines a class-agnostic attention value for each of the plurality of video frames of the video file, and a second branch of the machine learning model that determines a binary classification score for each of the plurality of video frames of the video file, and
      a video-level content classification score of the video file from the plurality of frame-level content classification scores for the video file that comprises a sum of each resultant of a multiplication of the class-agnostic attention value for a frame of the plurality of video frames of the video file by the binary classification score of the frame; and
   transmitting the plurality of frame-level content classification scores of the video file or the video-level content classification score of the video file to a client application or to a storage location.

5. The computer-implemented method of claim 4, wherein the generating the feature vector for each of the plurality of video frames of the video file comprises generating the feature vector that comprises video features and audio features for corresponding audio of the plurality of video frames of the video file.

6. The computer-implemented method of claim 5, where the video features are concatenated with the audio features in the feature vector.

7. The computer-implemented method of claim 4, wherein the classification scores indicate a likelihood of sexually explicit content.

8. The computer-implemented method of claim 4, further comprising:
   displaying, via a graphical user interface to a viewer of the video file, a skip query for a scene of the video file having at least one frame-level content classification score that exceeds a score threshold;
   receiving an indication from the viewer via the graphical user interface to skip the scene; and
   causing skipping of the scene to a following scene when the video file is viewed by the viewer.

9. The computer-implemented method of claim 8, wherein the causing the skipping of the scene comprises removing the scene from the video file before delivering at least a corresponding subset of the video file to the viewer.

10. The computer-implemented method of claim 8, wherein the displaying the skip query begins after viewing of the video file by the viewer has begun.

11. The computer-implemented method of claim 4, further comprising
   displaying, via a graphical user interface, an indication of the video file when the video-level content classification score exceeds a score threshold.

12. The computer-implemented method of claim 4, further comprising displaying, via a graphical user interface, an indication of a scene of the video file having the at least one frame-level content classification score that exceeds a score threshold.

13. A system comprising:
one or more electronic devices comprising a processor to implement a storage service to store a video file; and
one or more electronic devices comprising a processor to implement a content detector service, the content detector service including instructions that upon execution cause the content detector service to perform a method comprising:
receiving a content detection request for the video file;
generating, by a machine learning model in response to the content detection request:
a feature vector for each of a plurality of video frames of the video file,
a plurality of frame-level content classification scores of the video file from the feature vectors of the video file by sending the feature vector to a first branch of the machine learning model that determines a class-agnostic attention value for each of the plurality of video frames of the video file, and a second branch of the machine learning model that determines a binary classification score for each of the plurality of video frames of the video file, and
a video-level content classification score of the video file from the plurality of frame-level content classification scores for the video file that comprises a sum of each resultant of a multiplication of the class-agnostic attention value for a frame of the plurality of video frames of the video file by the binary classification score of the frame; and
transmitting the plurality of frame-level content classification scores of the video file or the video-level content classification score of the video file to a client application or to a storage location.

14. The system of claim 13, wherein the instructions upon execution cause the content detector service to perform operations wherein the generating the feature vector for each of the plurality of video frames of the video file comprises generating the feature vector that comprises video features and audio features for corresponding audio of the plurality of video frames of the video file.

15. The system of claim 14, wherein the video features are concatenated with the audio features in the feature vector.

16. The system of claim 13, wherein the instructions upon execution cause the content detector service to further perform operations comprising:
displaying, via a graphical user interface to a viewer of the video file, a skip query for a scene of the video file having at least one frame-level classification score that exceeds a score threshold;
receiving an indication from the viewer via the graphical user interface to skip the scene; and
causing skipping of the scene to a following scene when the video file is viewed by the viewer.

17. The system of claim 16, wherein the displaying the skip query begins after viewing of the video file by the viewer has begun.

18. The system of claim 13, wherein the instructions upon execution cause the content detector service to further perform operations comprising displaying, via a graphical user interface, an indication of the video file when the video-level content classification score exceeds a score threshold.

19. The system of claim 13, wherein the instructions upon execution cause the content detector service to further perform operations comprising displaying, via a graphical user interface, an indication of a scene of the video file having at least one frame-level content classification score that exceeds a score threshold.

20. The system of claim 13, wherein the classification scores indicate a likelihood of sexually explicit content.

* * * * *